US009267476B2

(12) United States Patent
Edwards et al.

(10) Patent No.: US 9,267,476 B2
(45) Date of Patent: Feb. 23, 2016

(54) TWO STAGE VALVE WITH CONICAL SEAT FOR FLOW SHUT-OFF AND SPOOL KNIFE EDGE FOR METERING FLOW CONTROL

(71) Applicant: Cummins Inc., Columbus, IN (US)

(72) Inventors: Romaine O. Edwards, Greenwood, IN (US); Edward B. Manring, Columbus, IN (US); Brian M. Watson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 206 days.

(21) Appl. No.: 14/159,723

(22) Filed: Jan. 21, 2014

(65) Prior Publication Data

US 2015/0204294 A1 Jul. 23, 2015

(51) Int. Cl.
*F16K 1/54* (2006.01)
*F02M 63/00* (2006.01)

(52) U.S. Cl.
CPC ......... *F02M 63/0073* (2013.01); *F02M 63/008* (2013.01); *Y10T 137/0363* (2015.04); *Y10T 137/8671* (2015.04)

(58) Field of Classification Search
CPC ......... F16K 1/54; F16K 1/52; F16K 31/0648; F16K 31/0662; F16K 31/0665; Y10T 137/0363; Y10T 137/8671; F02M 63/0073; F02M 63/008
USPC .......... 251/129.06–129.08, 129.15, 205, 282; 239/585.1–585.5
See application file for complete search history.

(56) References Cited

U.S. PATENT DOCUMENTS 3,469,590 A * 9/1969 Barker ................ F16K 31/0675 137/1
4,967,796 A 11/1990 Meyer
5,711,277 A 1/1998 Fuseya
6,035,532 A 3/2000 Earnhardt
7,188,788 B2 * 3/2007 Augustin ............. F02M 47/027 123/467
2002/0000216 A1 1/2002 Ismailov

FOREIGN PATENT DOCUMENTS

DE 102010042251 A1 * 4/2012 ......... F02M 51/0603
WO 02/052144 7/2002

OTHER PUBLICATIONS

International Search Report and Written Opinion dated May 5, 2015 in PCT/US2015/012126.

* cited by examiner

*Primary Examiner* — Marina Tietjen
(74) *Attorney, Agent, or Firm* — Faegre Baker Daniels LLP

(57) ABSTRACT

A valve (100) comprises a barrel (104) having a central bore (110), an inlet (112), and an outlet (114, 116), and a spool (120) disposed for motion within the central bore, including a ball tip (128), a metering edge (130), and a bore (132). The spool is moveable between a closed position, wherein the ball tip engages a seat (142) to prevent fluid flow through the inlet and the metering edge is disposed in a lower chamber (148) of the central bore to prevent the fluid flow through the outlet, and an opened position, wherein the tip is spaced apart from the seat to permit fluid flow through the inlet and the spool bore into an upper chamber (154) of the central bore to equalize pressure on the spool, and the metering edge is disposed in a flow path of the outlet to permit fluid flow through the outlet.

31 Claims, 5 Drawing Sheets

TWO STAGE VALVE WITH CONICAL SEAT FOR FLOW SHUT-OFF AND SPOOL KNIFE EDGE FOR METERING FLOW CONTROL

TECHNICAL FIELD

The present disclosure relates in general to high pressure pump systems, and, in particular, to a system and method for metering fluid to one or more high pressure pumping chambers.

BACKGROUND

Government imposed requirements for fuel economy and emissions reduction are one reason fuel systems manufacturers seek to provide precise control over the amount of fuel that is injected during injection events of a combustion cycle. More specifically, a goal of many high pressure fuel injection systems is to provide increased control of the amount of fuel injected by the fuel injectors of an internal combustion engine.

As shown in FIG. 1, a typical high pressure fuel pump system 10 generally includes a fuel supply 12 which supplies fuel to a hydro mechanical actuator such as an inlet metering valve 14. Metering valve 14, which is controlled by an electronic control module ("ECM") 15, is configured to control the amount of fuel provided to a plurality of high pressure pumping chambers 16. Pumping chambers 16 then disperse the fuel to a receptacle such as a common rail fuel apparatus or accumulator 18.

In many such systems, metering valve 14 includes a variable area orifice operated by a solenoid. In certain embodiments, the linear position of a spool inside metering valve 14 controls the amount of fuel to be supplied to pumping chambers 16. As such, metering valve 14 may be configured to prevent fuel from passing to chambers 16 when metering valve 14 is fully closed. However, in many systems, the mechanical configuration of metering valve 14 is insufficient to completely prevent fuel flow, and some leakage occurs. Moreover, in some systems the pressure of the fuel supply 12 to metering valve 14 requires significant counter-force by valve 14 when valve 14 is moved to a partially opened position to maintain valve 14 in its desired position. Generally, this counter-force is provided by a high performance solenoid controlled by ECM 15. Finally, in order to deliver the fuel economy and emission reduction desired, it is desirable to provide a highly accurate mechanism for metering fuel to chambers 16 when valve 14 is opened.

SUMMARY

According to one embodiment of the disclosure, a metering valve is provided comprising a barrel having a central bore, at least one inlet in flow communication with the central bore, and at least one outlet in flow communication with the central bore, and a spool disposed for reciprocal motion within the central bore of the barrel. In such an embodiment, the spool includes a ball tip, a metering edge, and at least one bore extending from a first orifice to a second orifice. The spool is moveable between a closed position, wherein the ball tip engages a conical seat formed in a wall of the barrel to prevent fluid flow between the at least one inlet and a lower chamber of the central bore and the metering edge is disposed in the lower chamber to prevent fluid flow between the lower chamber and the at least one outlet, and an opened position, wherein the ball tip is spaced apart from the conical seat to permit fluid flow between the inlet and the lower chamber and through the at least one bore of the spool into an upper chamber of the central bore to thereby equalize pressure of the fluid on the spool, and the metering edge is disposed in a flow path of the at least one outlet to permit fluid flow between the lower chamber and the at least one outlet. In one aspect of this embodiment, the valve further comprises a spring disposed in the lower chamber to bias the spool toward the opened position. In a variant of this aspect, the valve further comprises a solenoid for generating a magnetic flux as a function of input current, the magnetic flux causing a plunger in contact with the spool to move the spool toward the closed position against the biasing force of the spring. In another aspect of this embodiment, the valve further comprises a spring disposed in the valve to bias the spool toward the closed position, and a solenoid for generating a magnetic flux as a function of input current, the magnetic flux causing a plunger connected to the spool to move the spool toward the opened position against the biasing force of the spring. In another aspect, the barrel includes multiple outlets. In yet another aspect, the valve further comprises a plunger in contact with the spool, the plunger being positioned within a housing of the valve for guided movement as the spool is moved between the closed position and the opened position. In another aspect, the at least one bore extends substantially diagonally through a body of the spool from a side wall of the body to an upper surface of the body. In a variant of this aspect, fluid flow through the at least one bore causes rotation of the spool about a longitudinal axis of the spool. In still another aspect of this embodiment, when the spool is in a fully opened position, a plunger in contact with the spool engages a portion of a housing of the valve.

In another embodiment of the present disclosure, a system for metering fuel to at least one fuel pumping chamber is provided, comprising a fuel supply, an inlet metering valve having a first opening in flow communication with the fuel supply and a second opening in flow communication with the at least one pumping chamber, the valve further including a solenoid and a spool mounted within a housing for reciprocal movement between a plurality of opened positions, wherein fuel flows through the valve from the fuel supply to the at least one pumping chamber, and a closed position, wherein fuel is substantially prevented from flowing through the valve, and an ECM configured to provide signals to the solenoid to position the spool into the plurality of opened positions and the closed position. In this embodiment, the spool includes a ball tip at one end that engages a seating surface to prevent fuel flow when the spool is in the closed position, a metering edge disposed on an outer surface of the spool that cooperates with the second opening when the armature is in the plurality of opened positions to meter the quantity of fuel flowing through the valve, and the valve includes a flow path between a first chamber disposed between the first opening and the second opening and a second chamber disposed adjacent another end of the spool, the flow path permitting fuel flow between the first chamber and the second chamber to substantially equalize pressure exerted by the fuel on each end of the spool. According to one aspect of this embodiment, the valve includes a barrel having a central bore defining the first chamber adjacent the one end of the spool and the second chamber adjacent the other end of the spool. In a variant of this aspect, the barrel further defines the first opening and the second opening. In another variant, the barrel defines a plurality of outlets. Another aspect of this embodiment further comprises a spring disposed in the first chamber to bias the spool toward the plurality of opened positions. In a variant of this aspect, the solenoid generates a magnetic flux as a function of an input current from the ECM, the magnetic flux urging the spool to move toward the closed position against the biasing force of the spring. Another aspect further comprises a spring disposed within the valve to bias the spool toward the closed position, wherein the solenoid generates a magnetic flux as a function of an input current from the ECM, the magnetic flux urging the spool to move toward the plurality of opened positions against the biasing force of the spring. In yet another aspect, the valve further includes a plunger in contact with the spool, the plunger being positioned within the housing of the valve for guided movement as the spool is moved between the closed position and the plurality of opened positions. In still another aspect, the flow path includes at least one bore extending through the spool from a first orifice disposed in the first chamber to a second orifice disposed in the second chamber, the at least one bore permitting fuel flow between the first chamber and the second chamber to substantially equalize pressure exerted by the fuel on each end of the spool. In a variant of this aspect, the at least one bore extends substantially diagonally through a body of the spool from the first orifice to the second orifice such that fuel flow through the at least one bore causes rotation of the spool about a longitudinal axis of the spool. In another aspect of this embodiment, the flow path includes at least one groove extending from the first chamber to the second chamber. In a variant of this aspect, the at least one groove is formed in a side wall of a body of the spool. In still another aspect, the flow path includes at least one flat formed in a side wall of a body of the spool and extending from the first chamber to the second chamber. In yet another aspect, when the spool is in a fully opened position, a plunger in contact with the spool engages a portion of the housing of the valve to limit further movement of the spool away from the closed position.

In yet another embodiment of the present disclosure, a method of metering fuel to a fuel pumping chamber is provided, comprising supplying fuel to a metering valve, supplying a signal to the metering valve that activates a solenoid which moves a spool of the metering valve against a biasing force of a spring, and controlling the signal supplied to the metering valve to cause movement of the metering valve between a closed position, wherein a ball tip of the spool engages a conical seat at one opening of the valve to substantially prevent fuel from flowing through the valve, and a plurality of opened positions, wherein a metering edge of the spool is disposed within a flow path of another opening of the valve to permit a metered quantity of fuel to flow to the pumping chamber, and a bore extending through the spool distributes pressure exerted on the spool by the fuel to an upper surface of the spool. In one aspect of this embodiment, the valve includes a barrel having a central bore that receives the spool, the central bore defining a first chamber adjacent one end of the spool and a second chamber adjacent the upper surface of the spool. In a variant of this aspect, the barrel further defines the openings of the valve. In another variant, the spring is disposed in the first chamber to bias the spool toward the plurality of opened positions. In another aspect of this embodiment, the spring is disposed in the valve to bias the spool toward the closed position. In another aspect, supplying a signal includes generating a magnetic flux as a function of an input current supplied by an ECM, the magnetic flux urging the spool to move toward the closed position against the biasing force of the spring. In still another aspect, supplying a signal includes generating a magnetic flux as a function of an input current supplied by an ECM, the magnetic flux urging the spool to move out of the closed position against the biasing force of the spring. Another aspect of this embodiment further includes limiting movement of the spool away from the closed position by causing a plunger in contact with the spool to engage a portion of a housing of the valve.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EXEMPLARY EMBODIMENTS

The embodiments disclosed herein are not intended to be exhaustive or limit the invention to the precise form disclosed in the following detailed description. Rather, the embodiments were chosen and described so that others skilled in the art may utilize their teachings.

Figure 1:
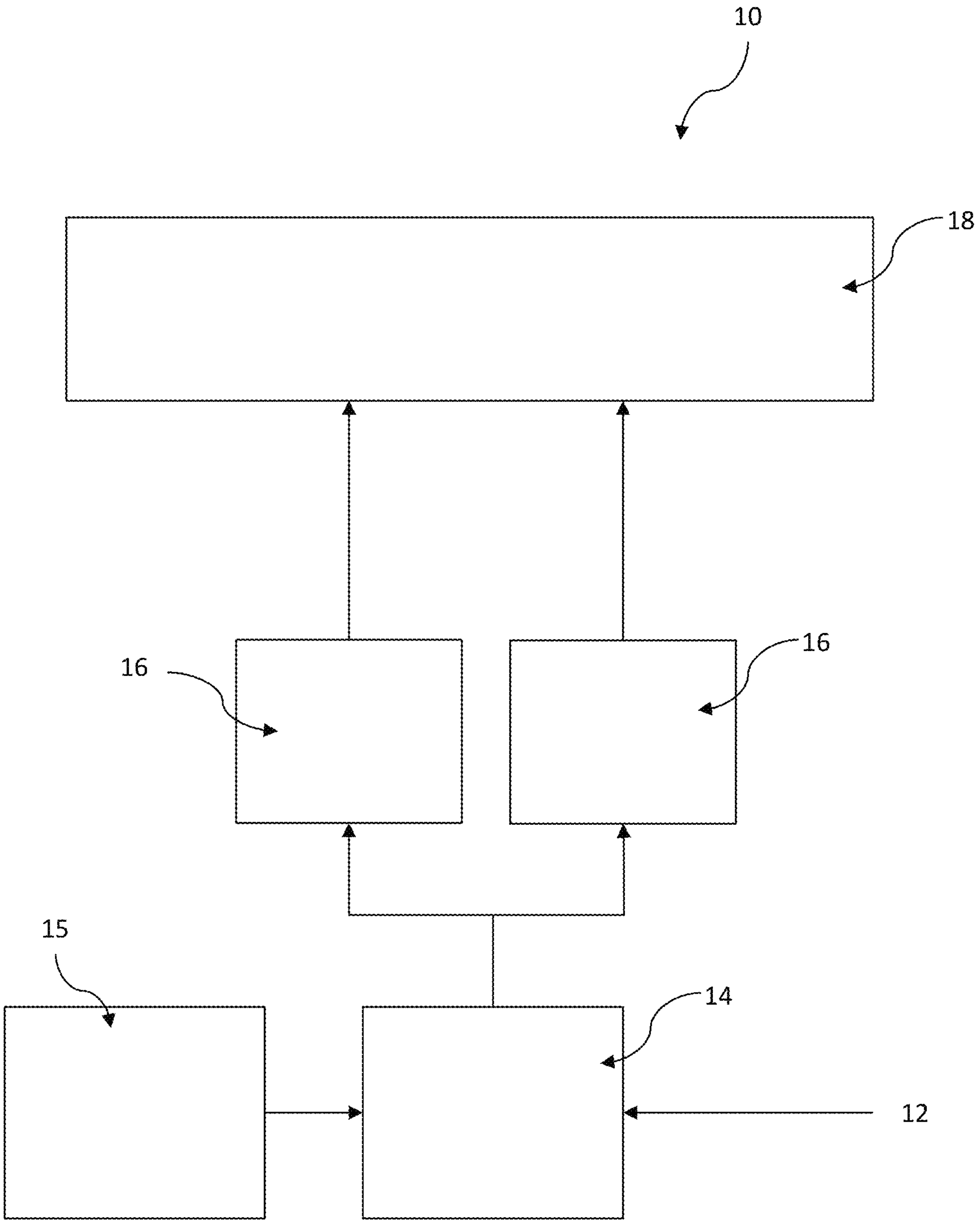
FIG. 1 is a conceptual block diagram of components of a high pressure fuel pump system.

Embodiments of an inlet metering valve according to the present disclosure are described herein in the context of a work machine having a high pressure fuel pump system 10 as depicted in FIG. 1. It should be understood that a work machine may be any type of fixed or mobile machine that performs some type of operation required by a particular application. Non-limiting examples of work machines may include commercial machines, such as cranes, earth moving machines, other material handling equipment, farming equipment, marine vessels, aircraft, vehicles of any type and power-generation equipment. In particular applications, the present metering valve is used in conjunction with a diesel engine that forms part of such a working machine.

Figure 2:
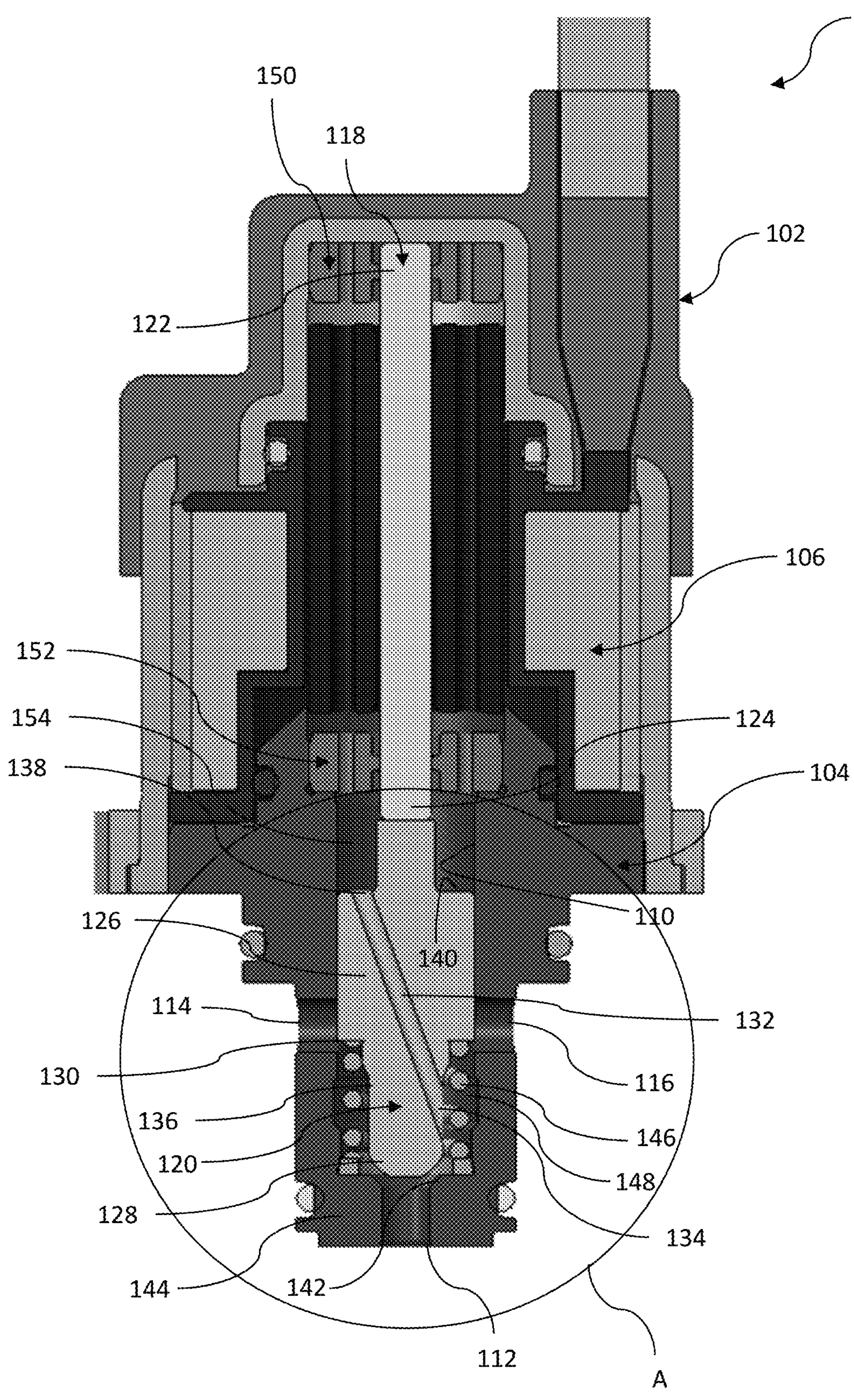
FIG. 2 is a cross-sectional view of one embodiment of an inlet metering valve according to the present disclosure in an opened position.
Figure 4:
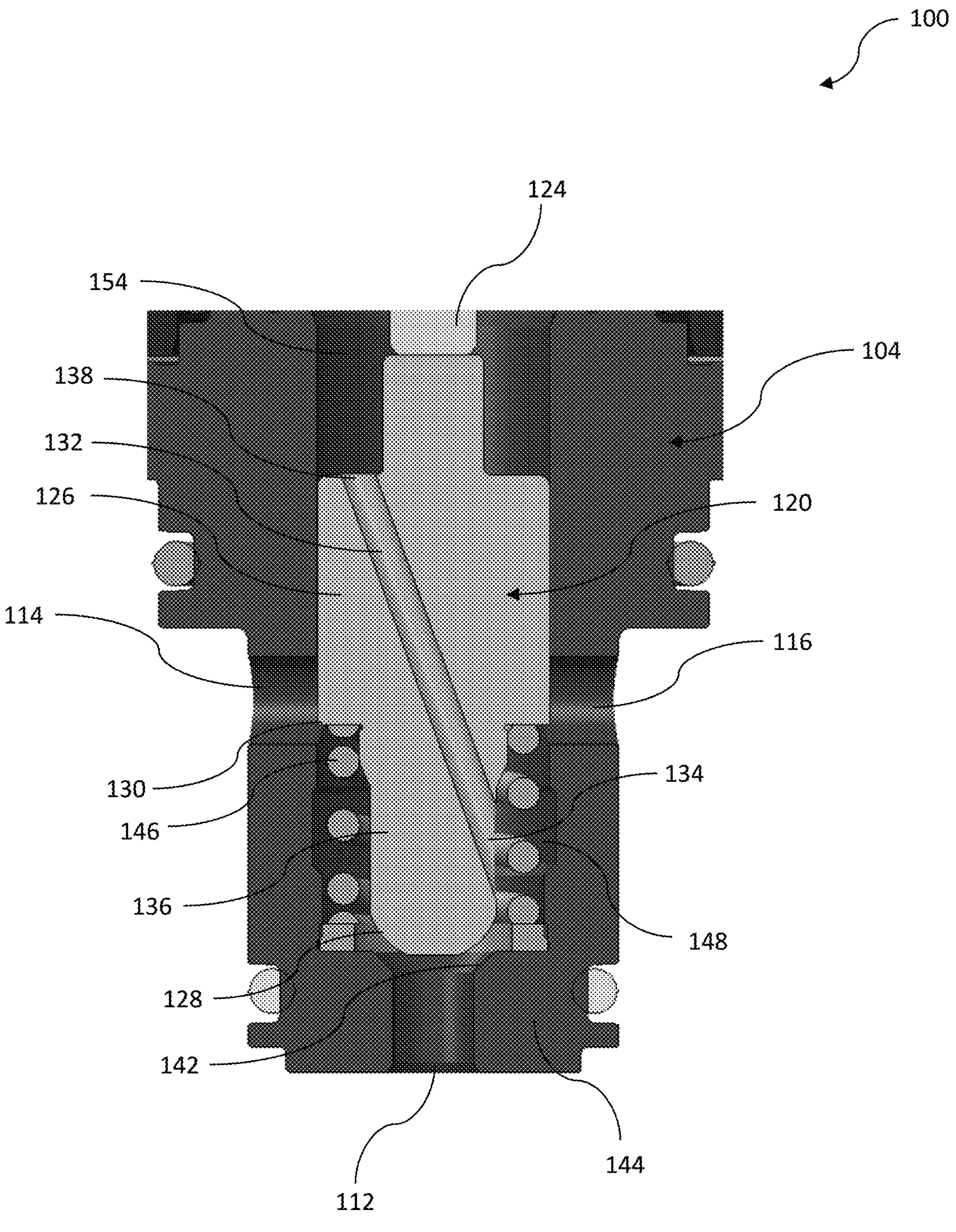
FIG. 4 is an enlarged view of portion A of FIG. 2.

Referring now to FIGS. 2 and 4, one embodiment of an inlet metering valve according to the present disclosure is shown. Valve 100 generally includes a housing 102 which at least partially contains a valve barrel 104, a solenoid 106, a plunger 118 and a spool 120. Barrel 104 includes a central bore 110, an inlet 112 in flow communication with central bore 110, and outlets 114, 116 in flow communication with central bore 110. In this embodiment, two additional outlets (not shown) are formed in barrel 104 in perpendicular relationship to outlets 114, 116. It should be understood, however, that more or fewer outlets may be used according to the principles described herein.

In the embodiment described herein, inlet 112 receives fuel from fuel supply 12 depicted in FIG. 1 and outlets 114, 116 provide metered fuel (in the manner described below) to pumping chambers 16 depicted in FIG. 1. It should be understood, however, that the valve according to the present disclosure can meter fluid or any type (i.e., not just fuel) and that the direction of flow of the fluid may opposite to that described herein. In other words, fluid may flow into the valve through the openings labeled outlets 114, 116 in the drawings, and out of the valve through the opening labeled inlet 112 in the drawings.

In one embodiment, plunger 118 is formed as an elongated rod having an upper end 122 and a lower end 124 which contacts spool 120. In one embodiment, spool 120 includes a substantially cylindrical body 126 sized to fit within central bore 110 of barrel 104 with low clearance and for reciprocating movement in the manner described below. Spool 120 further includes a ball tip 128 at an end distal to lower end 124 of plunger 118, a circumferential metering edge 130, and bore 132 extending through body 126. More specifically, in one embodiment bore 132 extends from a lower orifice 134 disposed in a side wall 136 adjacent ball tip 128 and below metering edge 130 to an upper orifice 138 disposed in an upper surface 140 of body 126.

Barrel 104 further includes a conical seat 142 formed at the inner end of inlet 112 in lower wall 144 of barrel 104. Additionally, a spring 146 is disposed within a lower chamber 148 of central bore 110 between lower wall 144 of barrel 104 and metering edge 130. As is further described below, in one embodiment spring 146 biases spool 120 upwardly such that valve 100 is biased toward the opened position shown in FIGS. 2 and 4. Movement of plunger 118 is guided by upper guide 150 and lower guide 152. As will be apparent to one skilled in the art, valve 100 may instead be configured such that spool 120 is biased toward the closed position shown in FIGS. 3 and 5. In such an embodiment, spring 146 may be positioned in upper chamber 154 of barrel 104 to exert a downward biasing force onto upper surface 140 of spool body 126. Alternatively, spring 146 may have a normally compressed shape and be disposed in lower chamber 148 with one end connected to wall 144 and another end connected to body 126. In any such "normally closed" embodiment of valve 100, lower end 124 of plunger 118 is connected to spool 120 and solenoid 106, when powered, causes plunger 118 to move upwardly thereby moving spool 120 out of its normally closed position.

While not shown in the drawings, solenoid 106 of valve 100 is coupled to ECM 15 (FIG. 1) to receive control current from ECM 15. In one embodiment, the amount of current supplied to solenoid 106 by ECM 15 determines the strength of the magnetic flux generated by solenoid 106. In general, the strength of the magnetic flux generated by solenoid 106, which in one embodiment imparts a downward force on armature 108, determines the linear position of spool 120 against the upward biasing force of spring 146. When valve 100 is in the opened position as shown in FIGS. 2 and 4, insufficient current is supplied to solenoid 106 by ECM 15 to overcome the upward biasing force of spring 146 and cause downward movement of spool 120. As such, plunger 118 is in its uppermost position with its upper end 150 engaged against housing 102, which thereby limits upward movement of plunger 118 and spool 120. In this fully opened position, valve 100 permits maximum flow of fluid through barrel 104. More specifically, in the embodiment shown fluid flows into inlet 112, between conical seat 142 and ball tip 128, into lower chamber 148, and out of barrel 104 through the spaces formed between metering edge 130 and outlets 114, 116.

Figure 3:
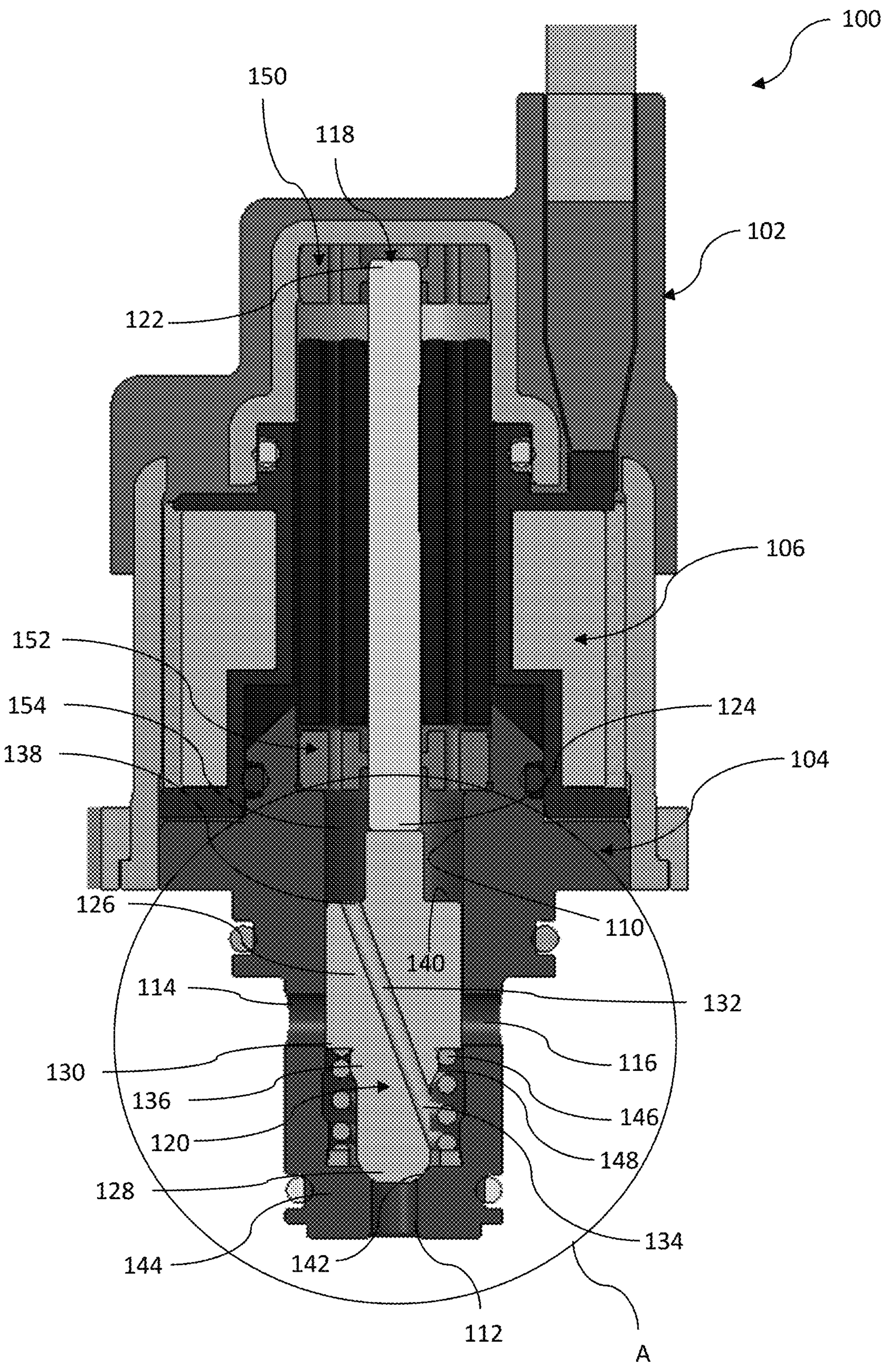
FIG. 3 is a cross-sectional view of the inlet metering valve of FIG. 2 in a closed position.
Figure 5:
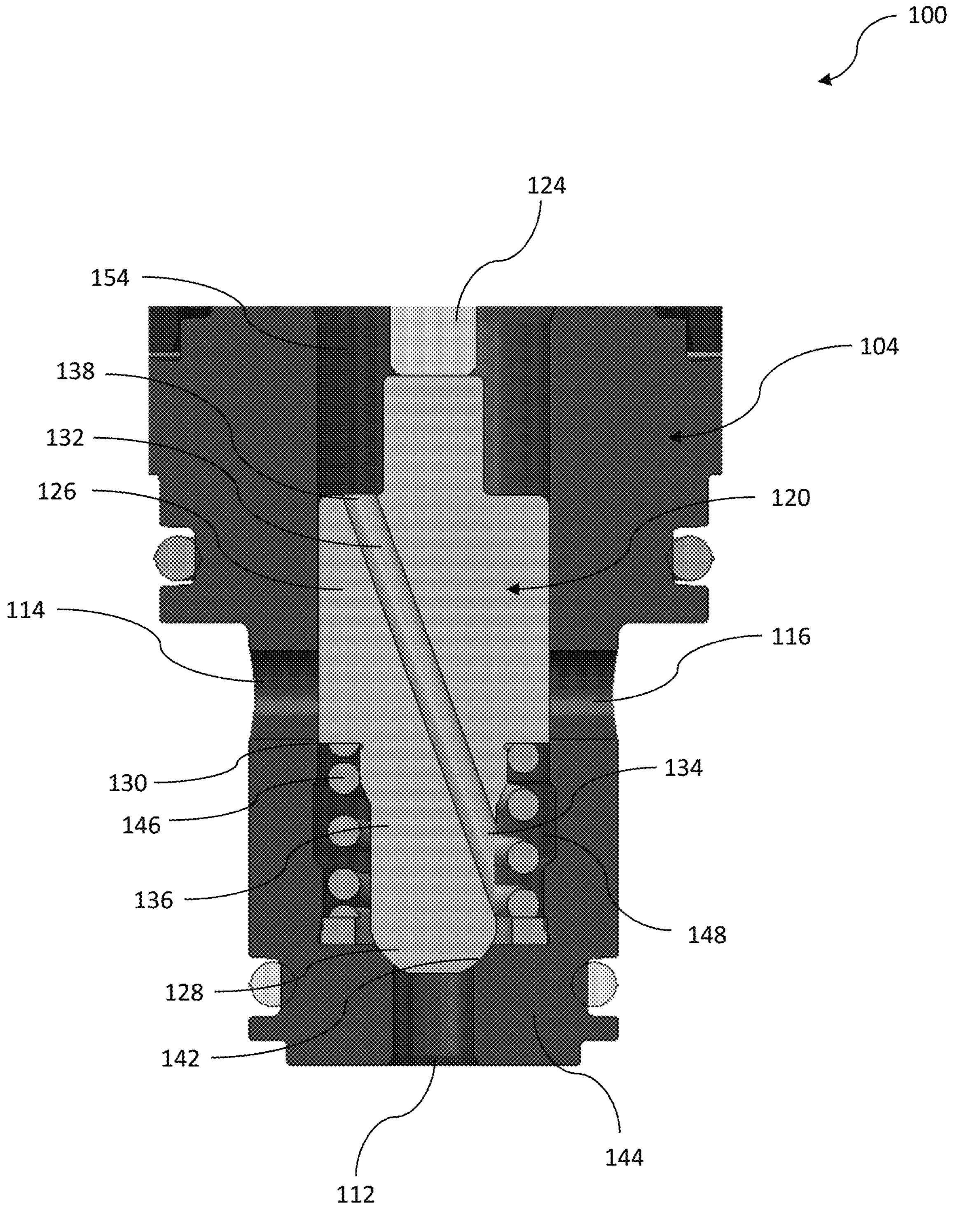
FIG. 5 is an enlarged view of portion A of FIG. 3.

Referring now to FIGS. 3 and 5, when valve 100 is in the closed position, sufficient current is supplied to solenoid 106 by ECM 15 to overcome the upward biasing force of spring 146. As such, spool 120 is in its lowermost position such that ball tip 128 engages conical seat 142 and metering edge 130 is disposed below outlets 114, 116 rather than in the flow path of outlets 114, 116 as shown in FIGS. 2 and 4. Consequently, fluid is prevented from flowing through valve 100 by two mechanisms. First, the seal between ball tip 128 and conical seat 142 prevents fluid from entering lower chamber 148 of barrel 104. Second, the position of metering edge 130 below outlets 114, 116 and tight fit between body 126 of spool 120 and central bore 110 of barrel 104 prevents fluid from flowing from lower chamber 148 through outlets 114, 116.

Valve 100 is moved from its closed position (FIGS. 3 and 5) to its opened position (FIGS. 2 and 4) by reducing the current supplied to solenoid 106. As the current is reduced, the downward magnetic flux force exerted by solenoid 106 on plunger 118 begins to be overcome by the upward force of spring 146 on spool 120. Consequently, plunger 118 and spool 120 begin to move upwardly. As this occurs, ball tip 128 separates from conical seat 142 and permits fluid to enter into lower chamber 148. It should be understood that other near zero leak mating surfaces (i.e., other than ball tip 128 and conical seat 142) may be used to prevent fluid flow into lower chamber 148 until spool 120 is permitted to move upwardly by solenoid 106. For example, various combinations of ball, conical, flat or crowned spool tip surfaces may be used with conical, flat or crowned seating surfaces.

As the fluid fills lower chamber 148, it flows into lower orifice 134 of bore 132. The fluid further flows out of upper orifice 138 and fills upper chamber 154. With the pressure balance drilling provided by bore 132 in this manner, the pneumatic pressure placed on spool 120 by the fluid is substantially equalized between lower chamber 148 and upper chamber 154. As such, solenoid 106 does not need to be sized to overcome the upward biasing force of spring 146 in addition to the upward force applied to spool 120 by the fuel flowing into inlet 112.

When valve 100 is moved to an opened position such that metering edge 130 is positioned within the flow path of outlets 114, 116, fluid not only flows from lower chamber 148 through outlets 114, 116, fluid also flows through diagonal bore 132, into upper chamber 154, and from upper chamber 154, between spool 120 and the inner surface of central bore 110, through outlets 114, 116. The diagonal orientation of diagonal bore 132 and the fluid flow through bore 132 causes spool 120 to rotate or spin about its longitudinal axis. This rotation occurs each time valve 100 is moved to an opened position, and provides for distributed wear on the surfaces of spool 120.

While a diagonal bore 132 is shown in the drawings for providing the above-described pressure balancing, it should be understood that many different balancing configurations that provide a flow path between lower chamber 148 and upper chamber 154 may be employed. For example, grooves or flats may be formed in the outer surface of side wall 136 of spool 120, a plurality of ports may be formed through body 126, grooves may be formed on the inner surface of central bore 110, etc. In still other embodiments, the clearance between side wall 136 of spool 120 and the inner surface of central bore 110 may be adjusted such that fluid may flow around spool 120 between lower chamber 148 and upper chamber 154 to balance pressure exerted on spool 126.

As the current supplied to solenoid 106 is further reduced, plunger 118 moves upwardly within upper guide 150 and lower guide 152, and spool 120 moves further upwardly within central bore 110. Eventually, metering edge 130 is disposed in the flow path of outlets 114, 116 such that lower chamber 148 is in flow communication with outlets 114, 116. The knife edge formed by metering edge 130 not only functions to prevent fluid flow out of lower chamber 148 when metering edge 130 is positioned below outlets 114, 116, it also provides highly precise flow characteristics when metering edge is positioned in the flow path of outlets 114, 116. More specifically, the knife edge results in a very precise flow vs. solenoid 106 current curve.

The foregoing description has been presented for the purposes of illustration and description. It is not intended to be exhaustive or to limit the disclosure to the exemplary embodiments disclosed. Many modifications and variations are possible in light of the above teachings. It is intended that the scope of the invention be limited not by this detailed description of examples, but rather by the claims appended hereto.

What is claimed is:

1. A metering valve, comprising:

a barrel having a central bore, at least one inlet in flow communication with the central bore, and at least one outlet in flow communication with the central bore; and a spool disposed for reciprocal motion within the central bore of the barrel, the spool including a ball tip, a metering edge, and at least one bore extending from a first orifice to a second orifice;

wherein the spool is moveable between a closed position, wherein the ball tip engages a conical seat formed in a wall of the barrel to prevent fluid flow between the at least one inlet and a lower chamber of the central bore and the metering edge is disposed in the lower chamber to prevent fluid flow between the lower chamber and the at least one outlet, and an opened position, wherein the ball tip is spaced apart from the conical seat to permit fluid flow between the inlet and the lower chamber and through the at least one bore of the spool into an upper chamber of the central bore to thereby equalize pressure of the fluid on the spool, and the metering edge is disposed in a flow path of the at least one outlet to permit fluid flow between the lower chamber and the at least one outlet.

2. The metering valve of claim 1, further comprising a spring disposed in the lower chamber to bias the spool toward the opened position.

3. The metering valve of claim 2, further comprising a solenoid for generating a magnetic flux as a function of input current, the magnetic flux causing a plunger in contact with the spool to move the spool toward the closed position against the biasing force of the spring.

4. The metering valve of claim 1, further comprising a spring disposed in the valve to bias the spool toward the closed position, and a solenoid for generating a magnetic flux as a function of input current, the magnetic flux causing a plunger connected to the spool to move the spool toward the opened position against the biasing force of the spring.

5. The metering valve of claim 1, wherein the barrel includes multiple outlets.

6. The metering valve of claim 1, further comprising a plunger in contact with the spool, the plunger being positioned within a housing of the valve for guided movement as the spool is moved between the closed position and the opened position.

7. The metering valve of claim 1, wherein the at least one bore extends substantially diagonally through a body of the spool from a side wall of the body to an upper surface of the body.

8. The metering valve of claim 7, wherein fluid flow through the at least one bore causes rotation of the spool about a longitudinal axis of the spool.

9. The metering valve of claim 1, wherein when the spool is in a fully opened position, a plunger in contact with the spool engages a portion of a housing of the valve.

10. A system for metering fuel to at least one fuel pumping chamber, comprising:

a fuel supply;

an inlet metering valve having a first opening in flow communication with the fuel supply and a second opening in flow communication with the at least one pumping chamber, the valve further including a solenoid and a spool mounted within a housing for reciprocal movement between a plurality of opened positions, wherein fuel flows through the valve from the fuel supply to the at least one pumping chamber, and a closed position, wherein fuel is substantially prevented from flowing through the valve; and an ECM configured to provide signals to the solenoid to position the spool into the plurality of opened positions and the closed position;

wherein the spool includes a ball tip at one end that engages a seating surface to prevent fuel flow when the spool is in the closed position, a metering edge disposed on an outer surface of the spool that cooperates with the second opening when the armature is in the plurality of opened positions to meter the quantity of fuel flowing through the valve, and wherein the valve includes a flow path between a first chamber disposed between the first opening and the second opening and a second chamber disposed adjacent another end of the spool, the flow path permitting fuel flow between the first chamber and the second chamber to substantially equalize pressure exerted by the fuel on each end of the spool.

11. The system of claim 10, wherein the valve includes a barrel having a central bore defining the first chamber adjacent the one end of the spool and the second chamber adjacent the other end of the spool.

12. The system of claim 11, wherein the barrel further defines the first opening and the second opening.

13. The system claim 11, wherein the barrel defines a plurality of outlets.

14. The system of claim 10, further comprising a spring disposed in the first chamber to bias the spool toward the plurality of opened positions.

15. The system of claim 14, wherein the solenoid generates a magnetic flux as a function of an input current from the ECM, the magnetic flux urging the spool to move toward the closed position against the biasing force of the spring.

16. The system of claim 10, further comprising a spring disposed within the valve to bias the spool toward the closed position, wherein the solenoid generates a magnetic flux as a function of an input current from the ECM, the magnetic flux urging the spool to move toward the plurality of opened positions against the biasing force of the spring.

17. The system of claim 10, wherein the valve further includes a plunger in contact with the spool, the plunger being positioned within the housing of the valve for guided movement as the spool is moved between the closed position and the plurality of opened positions.

18. The system of claim 10, wherein the flow path includes at least one bore extending through the spool from a first orifice disposed in the first chamber to a second orifice disposed in the second chamber, the at least one bore permitting fuel flow between the first chamber and the second chamber to substantially equalize pressure exerted by the fuel on each end of the spool.

19. The system of claim 18, wherein the at least one bore extends substantially diagonally through a body of the spool from the first orifice to the second orifice such that fuel flow through the at least one bore causes rotation of the spool about a longitudinal axis of the spool.

20. The system of claim 10, wherein the flow path includes at least one groove extending from the first chamber to the second chamber.

21. The system of claim 20, wherein the at least one groove is formed in a side wall of a body of the spool.

22. The system of claim 10, wherein the flow path includes at least one flat formed in a side wall of a body of the spool and extending from the first chamber to the second chamber.

23. The system of claim 10, wherein when the spool is in a fully opened position, a plunger in contact with the spool engages a portion of the housing of the valve to limit further movement of the spool away from the closed position.

24. A method of metering fuel to a fuel pumping chamber, comprising:

supplying fuel to a metering valve;

supplying a signal to the metering valve that activates a solenoid which moves a spool of the metering valve against a biasing force of a spring; and controlling the signal supplied to the metering valve to cause movement of the metering valve between a closed position, wherein a ball tip of the spool engages a conical seat at one opening of the valve to substantially prevent fuel from flowing through the valve, and a plurality of opened positions, wherein a metering edge of the spool is disposed within a flow path of another opening of the valve to permit a metered quantity of fuel to flow to the pumping chamber, and a bore extending through the spool distributes pressure exerted on the spool by the fuel to an upper surface of the spool.

25. The method of claim 24, wherein the valve includes a barrel having a central bore that receives the spool, the central bore defining a first chamber adjacent one end of the spool and a second chamber adjacent the upper surface of the spool.

26. The method of claim 25, wherein the barrel further defines the openings of the valve.

27. The method of claim 25, wherein the spring is disposed in the first chamber to bias the spool toward the plurality of opened positions.

28. The method of claim 24, wherein the spring is disposed in the valve to bias the spool toward the closed position.

29. The method of claim 24, wherein supplying a signal includes generating a magnetic flux as a function of an input current supplied by an ECM, the magnetic flux urging the spool to move toward the closed position against the biasing force of the spring.

30. The method of claim 24, wherein supplying a signal includes generating a magnetic flux as a function of an input current supplied by an ECM, the magnetic flux urging the spool to move out of the closed position against the biasing force of the spring.

31. The method of claim 24, further including limiting movement of the spool away from the closed position by causing a plunger in contact with the spool to engage a portion of a housing of the valve.

* * * * *